Ⅱ US010110618B1

United States Patent
Mao et al.

(10) Patent No.: US 10,110,618 B1
(45) Date of Patent: Oct. 23, 2018

(54) SYSTEM AND METHODS TO DETECT MOBILE CREDENTIAL LEAKS DURING DYNAMIC ANALYSIS

(71) Applicant: Symantec Corporation, Mountain View, CA (US)

(72) Inventors: Jun Mao, Torrance, CA (US); Jinghao Li, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 245 days.

(21) Appl. No.: 15/009,411

(22) Filed: Jan. 28, 2016

(51) Int. Cl.
*G06F 11/00* (2006.01)
*H04L 29/06* (2006.01)

(52) U.S. Cl.
CPC ...... *H04L 63/1416* (2013.01); *H04L 63/0815* (2013.01); *H04L 63/0853* (2013.01)

(58) Field of Classification Search
CPC ............. H04L 63/1416; H04L 63/0815; H04L 63/0853
See application file for complete search history.

(56) References Cited

U.S. PATENT DOCUMENTS

| 2011/0185429 | A1* | 7/2011 | Sallam | G06F 21/562 726/24 |
| 2017/0041309 | A1* | 2/2017 | Ekambaram | G06F 21/64 |

OTHER PUBLICATIONS http://www.welivesecurity.com/2015/07/09/apps-google-play-steal-facebook-credentials/.
http://www.enhanceie.com/Fiddler/help/httpsdecryption.asp.
https://developers.facebbok.com/docs/facebook-login/android/v2.4.
http://www.sciencedirect.com/science/article/pii/S1574119215001121.

* cited by examiner

*Primary Examiner* — Baotran N To
(74) *Attorney, Agent, or Firm* — Holland & Hart LLP

(57) ABSTRACT

The present disclosure relates to systems and methods for detecting malware. In some embodiments, a method may include detecting, via a processor, a user login event at an application; dynamically comparing, via the processor, the user login event with one or more expected behaviors associated with the application; and determining, via the processor, whether the application is potential malware based at least in part on a result of the comparing.

16 Claims, 8 Drawing Sheets

SYSTEM AND METHODS TO DETECT MOBILE CREDENTIAL LEAKS DURING DYNAMIC ANALYSIS

BACKGROUND

As mobile devices and other computing devices continue to advance, users may use personal credentials to access various applications on their mobile devices. Just as the number of applications has increased, so has the amount of malware designed to intercept and obtain user credentials. In many instances, users cannot distinguish between a legitimate login for an application and a fraudulent login provided by a malicious server.

Because of these malicious servers, a need exists for a system and methods to dynamically analyze login events to detect potential malware. Accordingly, the present systems, methods, and techniques address these and other problems.

SUMMARY

Existing malware detection systems may be limited in the manner in which they can identify malicious servers. For example, these systems may analyze text strings associated with Uniform Resource Locators (URLs) by comparing the text strings with known malware text strings in order to identify malware. These systems may be limited, however, to identifying servers as either "clean" or "malware" based only on this text string comparison, without any capability to identify other attributes of the potentially malicious server.

The present systems, methods, and techniques are designed to provide a more detailed and diversified analysis of login events in order to associate these events with potentially malicious servers. This dynamic analysis allows for comparison of one or more expected behaviors with observed behaviors associated with the login event in order to both identify the login event and to determine whether the login event is associated with potential malware.

Methods for detecting malware are disclosed. In some embodiments, the method may include detecting, via a processor, a user login event at an application. The method may further include dynamically comparing, via the processor, the user login event with one or more expected behaviors associated with the application. The method may further include determining, via the processor, whether the application is potential malware based at least in part on a result of the comparing.

In some embodiments, the dynamically comparing may further include comparing any one or more of server traffic, or application text, or application icons, or server Uniform Resource Locators (URLs), or required libraries associated with the user login event with a database of known one or more expected behaviors associated with the application.

In some embodiments, the dynamically comparing may further include decrypting the server traffic.

In some embodiments, detecting the user login event may include detecting one or more expected behaviors associated with a login event.

In some embodiments, the one or more expected behaviors associated with the login event may include any one or more of server traffic, or application text, or application icons, or server URLs, or required libraries associated with the application.

In some embodiments, the dynamically comparing may include running a legitimate use of one or more libraries associated with the application. The dynamically comparing may further include dynamically analyzing one or more behaviors associated with the legitimate use of one or more libraries associated with the application. The dynamically comparing may further include comparing any one or more of server traffic, or application text, or application icons, or server URLs, or required libraries associated with the user login event with the analyzed one or more behaviors associated with the legitimate use of the one or more libraries associated with the application.

In some embodiments, the method may further include, upon determining the application is potential malware, reporting the potential malware to the user.

In some embodiments, reporting the potential malware to the user may include detecting that the user login event has resulted in communication of one or more user login details to the malware application, and reporting that communication to the user.

An additional method for detecting malware is disclosed. In some embodiments, the method may include initiating, via a processor, a login event at an application. In some embodiments, the method may further include dynamically identifying, via the processor, one or more behaviors associated with the login event. In some embodiments, the method may further include detecting, via the processor, a successful login associated with the login event, and determining, via the processor, that the application is potential malware based at least in part on a result of the detecting.

In some embodiments, the method may further include compiling a database of one or more expected behaviors based at least in part on the identifying one or more behaviors associated with the login event.

In some embodiments, the identified one or more behaviors may include any one or more of server traffic, or application text, or application icons, or server URLs, or required libraries associated with the login event.

In some embodiments, the dynamically comparing may further include decrypting the server traffic.

An apparatus for detecting malware is also disclosed. In some embodiments, the apparatus may include a processor and a memory in electronic communication with the processor. The memory may store instructions executable by the processor to: detect a user login event at an application; dynamically compare the user login event with one or more expected behaviors associated with the application; and determine whether the application is potential malware based at least in part on a result of the comparing.

A non-transitory computer-readable storage medium storing computer executable instructions is also disclosed. In some embodiments, the computer executable instructions may be executed by a processor to cause the processor to perform the steps of: detecting a user login event at an application; dynamically comparing the user login event with one or more expected behaviors associated with the application; and determining whether the application is potential malware based at least in part on a result of the comparing.

Features from any of the above-mentioned or below-described embodiments may be used in combination with one another in accordance with the general principles described here. These and other embodiments, features, and advantages will be more fully understood upon reading the following detailed description in conjunction with the accompanying drawings and claims. The following description provides examples and is not limiting of the scope, applicability, and/or examples set forth in the claims. Changes may be made in the function and/or arrangement of elements discussed without departing from the scope of the disclosure. Various examples may omit, substitute, and/or add various procedures and/or components as appropriate. For instance, the methods described may be performed in an order different from that described, and/or various steps may be added, omitted, and/or combined. Also, features described with respect to some examples may be combined in other examples.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

Figure 1:
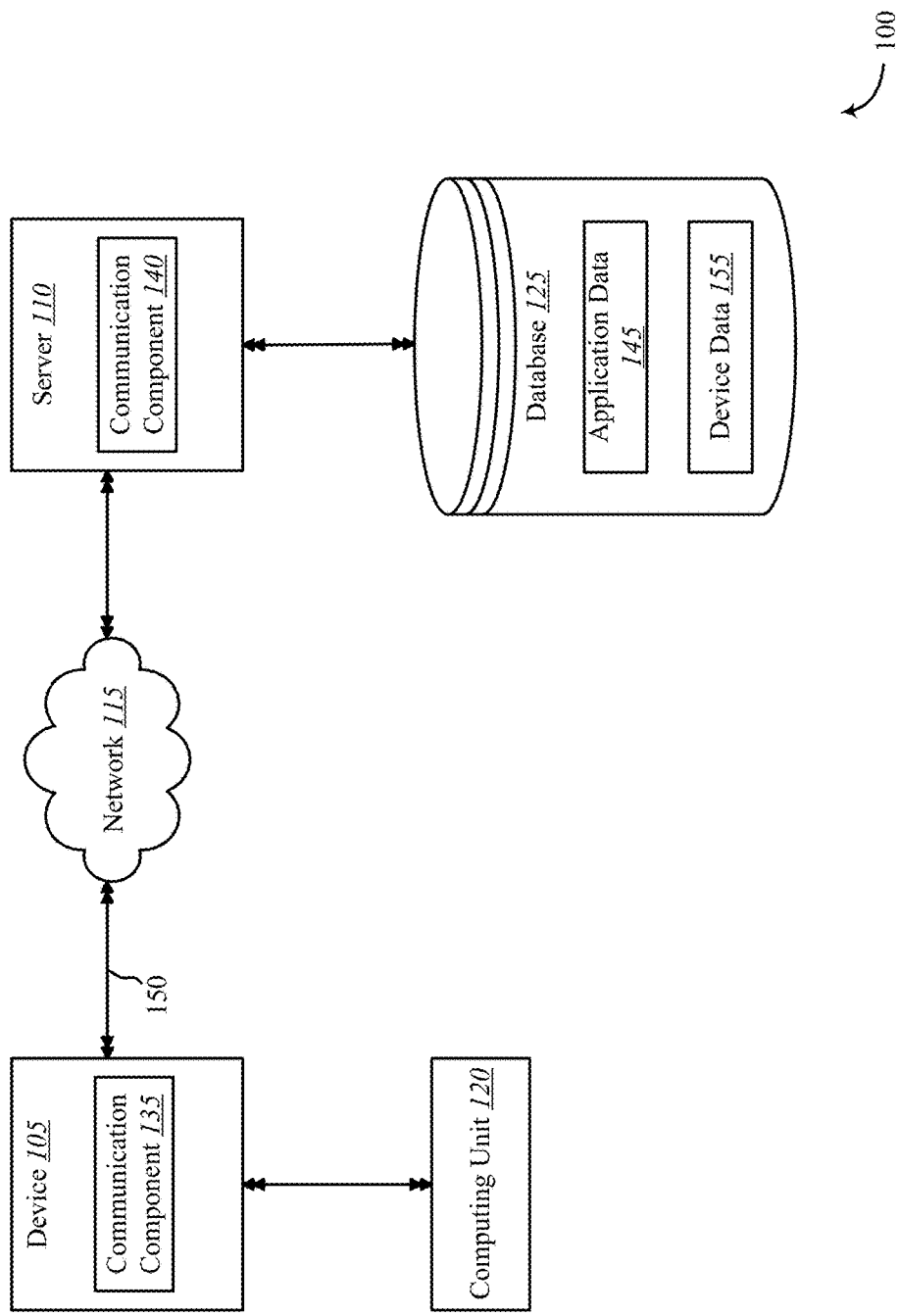
FIG. 1 is a block diagram illustrating embodiments in which the present systems and methods may be implemented, in accordance with various aspects of this disclosure.

While the embodiments described here are susceptible to various modifications and alternative forms, embodiments have been shown by way of example in the drawings and will be described in detail. However, the exemplary embodiments described here are not intended to be limited to the particular forms disclosed or to limit other forms disclosed and/or undisclosed. Rather, this disclosure covers all modifications, equivalents, and/or alternatives.

DETAILED DESCRIPTION

In some embodiments, the present systems, methods, and techniques include using dynamic analysis to detect attempts at acquiring user credentials by malicious servers during login events. Dynamic analysis may be run on the user environment or remotely from the user environment in various embodiments. The dynamic analysis can include monitoring one or more of a plurality of behaviors associated with the login event in order to compare the monitored behavior with expected behavior associated with an application running a legitimate use of the one or more libraries associated with that application.

FIG. 1 is a block diagram illustrating embodiments in which the present systems and methods may be implemented, in accordance with various aspects of this disclosure. FIG. 1 illustrates an example of a communications system 100 in accordance with various aspects of the disclosure. The communications system 100 may include device 105, server 110, network 115, computing unit 120, and/or database 125, among other components. The network 115 may provide user authentication, encryption, access authorization, tracking, Internet Protocol (IP) connectivity, and other access, calculation, modification, and/or functions. The device 105 may interface with the network 115 through a first set of wired and/or wireless communication links 150 to communicate with one or more local and/or remote servers 110.

The device 105 may perform communication configuration, adjustment, and/or scheduling for communication with other devices 105 and/or other components of communications system 100, or may operate under the control of a controller. In various examples, the devices 105 may communicate—either directly or indirectly (e.g., through network 115)—with each other over a second set of wired and/or wireless communication links 150. Device 105 may communicate with a backend server (such as the servers 110) directly and/or indirectly using the first set of one or more communication links 150.

The device 105 may wirelessly communicate with one or more other devices 105, servers 110, computing units 120, databases 125, and/or other components via one or more antennas. Each of the devices 105 may provide communication coverage and/or other features for an area. In some examples, device 105 may be referred to as a control device, a base transceiver station, a radio base station, an access point, a radio transceiver, or some other suitable terminology. The communications system 100 may include devices 105 of different types. There may be overlapping geographic coverage areas for one or more different parameters, including different technologies, features, subscriber preferences, hardware, software, technology, and/or methods. For example, each device 105 may be related to one or more discrete structures (e.g., a home, a business) and each of the one more discrete structures may be related to one or more discrete areas. In other examples, multiple devices 105 may be related to the same one or more discrete structures (e.g., multiple devices relating to a home and/or a business complex).

The devices 105 may be dispersed throughout the communications system 100 and each device 105 may be stationary and/or mobile. A device 105 may include a cellular phone, a personal digital assistant (PDA), a wireless modem, a wireless communication device, a handheld device, a tablet computer, a laptop computer, a cordless phone, a wireless local loop (WLL) station, a display device (e.g., TVs, computer monitors, etc.), a printer, a camera, and/or the like. A device 105 may also include or be referred to by those skilled in the art as a user device, a smartphone, a BLUETOOTH® device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, and/or some other suitable component and/or element.

The device 105 may wirelessly communicate with one or more other components (e.g., server 110) via one or more antennas. A device 105 may be able to communicate through one or more wired and/or wireless connections with various components such as computing units, base stations, and/or network equipment (e.g., servers, wireless communication points, etc.) and/or the like.

The communication links 150 shown in communications system 100 may include uplink (UL) transmissions from one or more devices 105 to one or more servers 110 and/or one or more computing units 120, and/or downlink (DL) transmissions, from one or more servers 110 and/or one or more computing units 120 to one or more devices 105. In some embodiments, a device 105 may communicate directly and/or indirectly with database 125 through one or more wired and/or wireless communication links. In some embodiments, one or more components may include one or more communication components (e.g., communication component 135, communication component 140, etc.). These communication components may be examples of a network interface card (NIC), among other things. Communication components may facilitate direct and/or indirect wired and/or wireless communication to receive applications, changes, configuration information, some combination, and/or other information.

The downlink transmissions may also be called forward link transmissions while the uplink transmissions may also be called reverse link transmissions. Each of the communication links 150 may include one or more carriers, where each carrier may be a signal made up of multiple sub-carriers (e.g., waveform signals of different frequencies) modulated according to the various radio technologies. Each modulated signal may be sent on a different sub-carrier and may carry control information (e.g., reference signals, control channels, etc.), overhead information, user data, etc. The communication links 150 may transmit bidirectional communications and/or unidirectional communications. Communication links 150 may include one or more connections, including but not limited to, 345 MHz, Wi-Fi, BLUETOOTH®, BLUETOOTH® Low Energy, cellular, Z-WAVE®, 802.11, peer-to-peer, LAN, WLAN, Ethernet, fire wire, fiber optic, and/or other connection types related to the present systems and methods.

In some embodiments of communications system 100, devices 105 (among other components) may include one or more antennas for employing antenna diversity schemes to improve communication quality and reliability between devices 105 and/or other elements, as an example. Additionally or alternatively, devices 105 and/or servers 110 (among other components) may employ multiple-input, multiple-output (MIMO) techniques that may take advantage of multi-path, mesh-type environments to transmit multiple spatial layers carrying the same or different coded data.

While the devices 105 may communicate with one or more components through one or more other components (e.g., communicate with database 125 through server 110), device 105 may also communicate directly with one or more other components via one or more direct communication links. Two or more devices 105 may also communicate via a direct communication link. Examples of direct communication links may include Wi-Fi Direct, BLUETOOTH®, wired, and/or other P2P group connections. The devices 105 in these examples may communicate according to the WLAN radio and baseband protocol including physical and MAC layers from IEEE 802.11, and its various versions including, but not limited to, 802.11b, 802.11g, 802.11a, 802.11n, 802.11ac, 802.11ad, 802.11ah, etc. In other implementations, other peer-to-peer connections and/or ad hoc networks may be implemented within communications system 100.

In some embodiments, device 105 may receive information relating to a login event or one or more expected behaviors associated with an application from one or more other sources through wired and/or wireless communication links. For example, device 105 may receive login event and/or expected behavior information (among other types of information) from a computing unit 120. Device 105 may receive server traffic information from computing unit 120. In some embodiments, device 105 and computing unit 120 may communicate directly through a wired and/or a wireless network. In other embodiments, device 105 and computing unit 120 may communicate through a network 115, for example.

In some examples, computing unit 120 may be similar to device 105. In other example, computing unit 120 may be different from device 105. A computing unit 120 may include a cellular phone, a personal digital assistant (PDA), a wireless modem, a wireless communication device, a handheld device, a tablet computer, a laptop computer, a cordless phone, a wireless local loop (WLL) station, a display device (e.g., TVs, computer monitors, etc.), a printer, a camera, and/or the like. A computing unit 120 may also include or be referred to by those skilled in the art as a user device, a smartphone, a BLUETOOTH® device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, and/or some other suitable component and/or element. In some examples, computing unit 120 may serve as a source for information relating to a login event or one or more expected behaviors associated with an application for use on and/or with device 105. For example, computing unit 120 may serve as a source for server traffic information that is pushed to and/or requested by device 105, among other things.

In some embodiments, device 105 may receive information relating to a login event or one or more expected behaviors associated with an application from one or more local and/or remote servers 110, through wired and/or wireless communication links. For example, device 105 may receive application text or icon information (among other types of information) from a server 110. Device 105 may receive server URL information from server 110. In some embodiments, device 105 and server 110 may communicate directly through a wired and/or a wireless network. In other embodiments, device 105 and server 110 may communicate through a network 115 using communication components 135 and/or 140, for example. In some embodiments, server 110 serves as a repository for expected behaviors associated with one or more applications, and device 105 may request (either automatically, based on program requirements, and/or based on a user's request) to receive information related to one or more expected behaviors.

Server 110 may provide the information relating to a login event or one or more expected behaviors associated with an application directly and/or based on queries and/or communications with database 125. Database 125 may store application data 145 (including, but not limited to, server traffic, application text, application icons, server URLs, required libraries associated with a user login event, and/or other information) and/or device data 155 (including, but not limited to, device installation parameters, device updates, system information, device uninstallation instructions, features, details, configurations), some combination, and/or other information.

Figure 2:
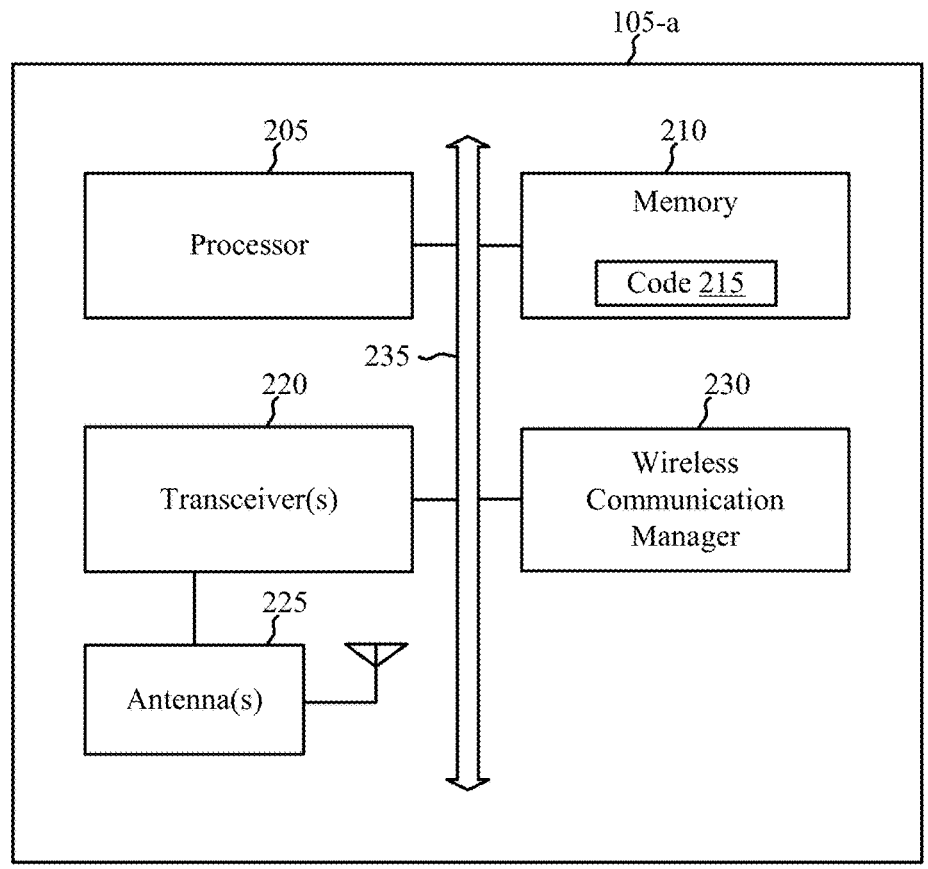
FIG. 2 is a block diagram illustrating embodiments in which the present systems and methods may be implemented, in accordance with various aspects of this disclosure.

FIG. 2 shows a block diagram 200 of a device 105-*a* for use in wireless communication, in accordance with various aspects of the present disclosure. The device 105-*a* may be included or be part of a personal computer (e.g., a laptop computer, a netbook computer, a tablet computer, etc.), a cellular telephone, a PDA, a DVR, an internet appliance, a gaming console, an e-reader, a vehicle, an Internet of Things (IoT) device, a home appliance, a lighting or alarm control system, etc. The device 105-*a* may, in some examples, have an internal power supply (not shown), such as a small battery, to facilitate mobile operation. In some examples, the device 105-*a* may be an example of aspects of one or more of the device 105 described with reference to FIG. 1.

The device 105-*a* may include a processor 205, a memory 210, at least one transceiver (represented by transceiver(s) 220), at least one antenna (represented by antenna(s) 225), or a wireless communication manager 230. Each of these components may be in communication with each other, directly or indirectly, over one or more buses 235.

The memory 210 may include random access memory (RAM) or read-only memory (ROM). The memory 210 may store computer-readable, computer-executable code 215 containing instructions that are configured to, when executed, cause the processor 205 to perform various functions described herein related to dynamically analyzing a login event to identify potential malware. Alternatively, the computer-executable code 215 may not be directly executable by the processor 205 but be configured to cause the device 105-*a* (e.g., when compiled and executed) to perform various of the functions described herein.

The processor 205 may include an intelligent hardware device, e.g., a central processing unit (CPU), a microcontroller, an ASIC, etc. The processor 205 may process information received through the transceiver(s) 220 or information to be sent to the transceiver(s) 220 for transmission through the antenna(s) 225. The processor 205 may handle, alone or in connection with the wireless communication manager 230, various aspects of communicating over (or managing communications over) one or more radio frequency spectrum bands.

The transceiver(s) 220 may include a modem configured to modulate packets and provide the modulated packets to the antenna(s) 225 for transmission, and to demodulate packets received from the antenna(s) 225. The transceiver(s) 220 may, in some examples, be implemented as one or more transmitters and one or more separate receivers. The transceiver(s) 220 may support communications in one or more radio frequency spectrum bands. The transceiver(s) 220 may be configured to communicate bi-directionally, via the antenna(s) 225, with one or more of the servers 110 described with reference to FIG. 1. While the device 105-*a* may include a single antenna, there may be examples in which the device 105-*a* may include multiple antennas 225.

The wireless communication manager 230 may be configured to perform or control some or all of the device techniques or functions described with reference to FIG. 1 related to dynamically analyzing login events and determining whether an application is potential malware. The wireless communication manager 230, or portions of it, may include a processor, or some or all of the functions of the wireless communication manager 230 may be performed by the processor 205 or in connection with the processor 205.

In some embodiments, one of ordinary skill in the art will appreciate various other aspects and/or method of virtualization can be employed in light of and in conjunction with the present systems, methods, and techniques of this disclosure, including, but not limited to, techniques and/or practices of and/or relating to detecting potential malware and/or other methods.

Figure 3:
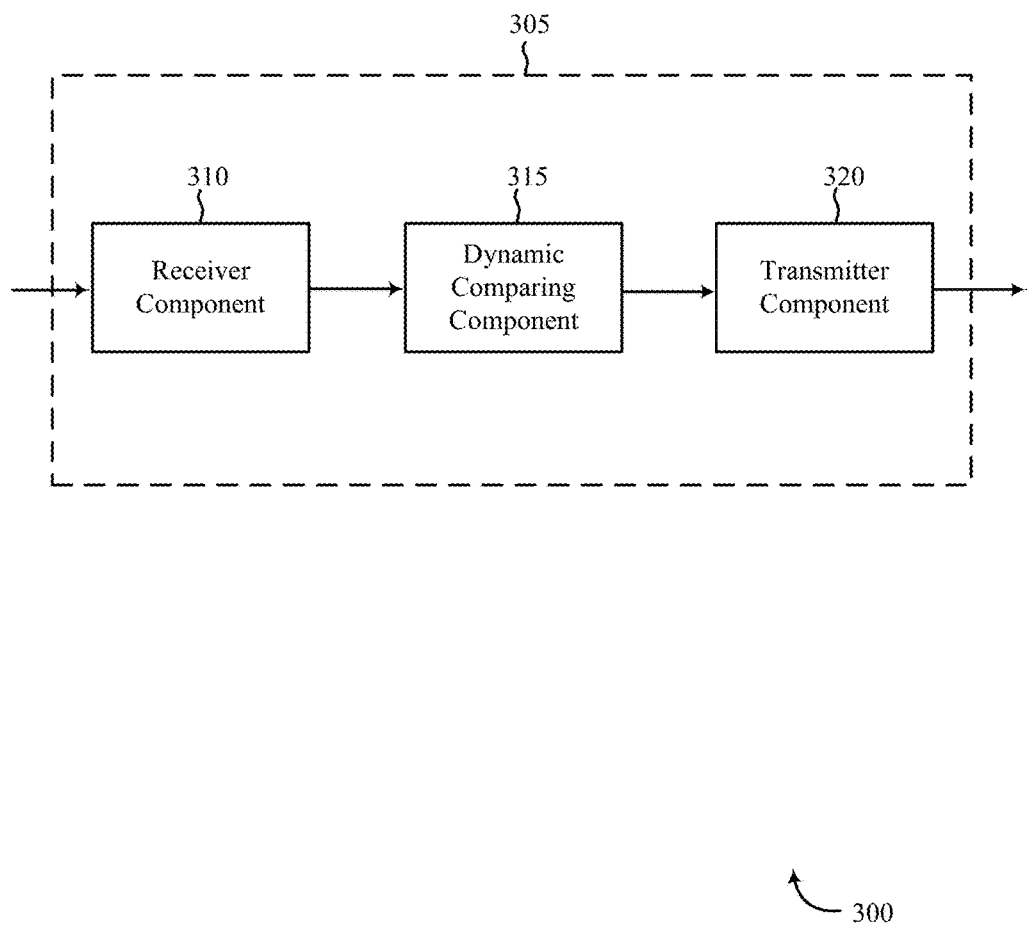
FIG. 3 is a block diagram illustrating embodiments in which the present systems and methods may be implemented, in accordance with various aspects of this disclosure.

FIG. 3 shows a block diagram 300 of a device 305 for use in detecting potential malware, in accordance with various aspects of this disclosure. The device 305 may be an example of one or more aspects of a device 105 and/or device 105-*a* described with reference to FIGS. 1 and/or 2, among others. The device 305 may include a receiver component 310, a dynamic comparing component 315, and/or a transmitter component 320. Each of these components may be in communication with each other—directly and/or indirectly.

The components of the device 305 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each component may also be implemented—in whole or in part—with instructions embodied in memory formatted to be executed by one or more general and/or application-specific processors.

The receiver component 310 may receive information such as packets, user data, and/or control information associated with various information channels (e.g., control channels, data channels, etc.). The receiver component 310 may be configured to receive information associated with a user login event, server traffic, application text, application icons, server URLs, required libraries associated with the user login event, and/or other information. Information may be passed on to the dynamic comparing component 315, and to other components of the device 305.

In some embodiments, dynamic comparing component 315 may receive information from receiver component 310 and/or another element of device 305 (such as those discussed with respect to FIGS. 1 and 2, among others). Dynamic comparing component 315 may perform one or more operations relating to the present system, methods, and techniques relating to detecting potential malware. Dynamic comparing component 315 may receive information relating to and/or may itself perform operations relating to one or more behaviors associated with device 305 and/or one or more applications, and/or other capabilities, some combination of these, and/or other techniques.

The transmitter component 320 may transmit the one or more signals received from other components of the device 205. The transmitter component 320 may transmit instructions, applications, programs, information, settings, actions, data, some combination, and/or other information to one or more other devices, servers, computing units, databases, some combination, and/or other elements and/or components. In some examples, the transmitter component 320 may be collocated with the receiver component 310 in a transceiver component.

Figure 4:
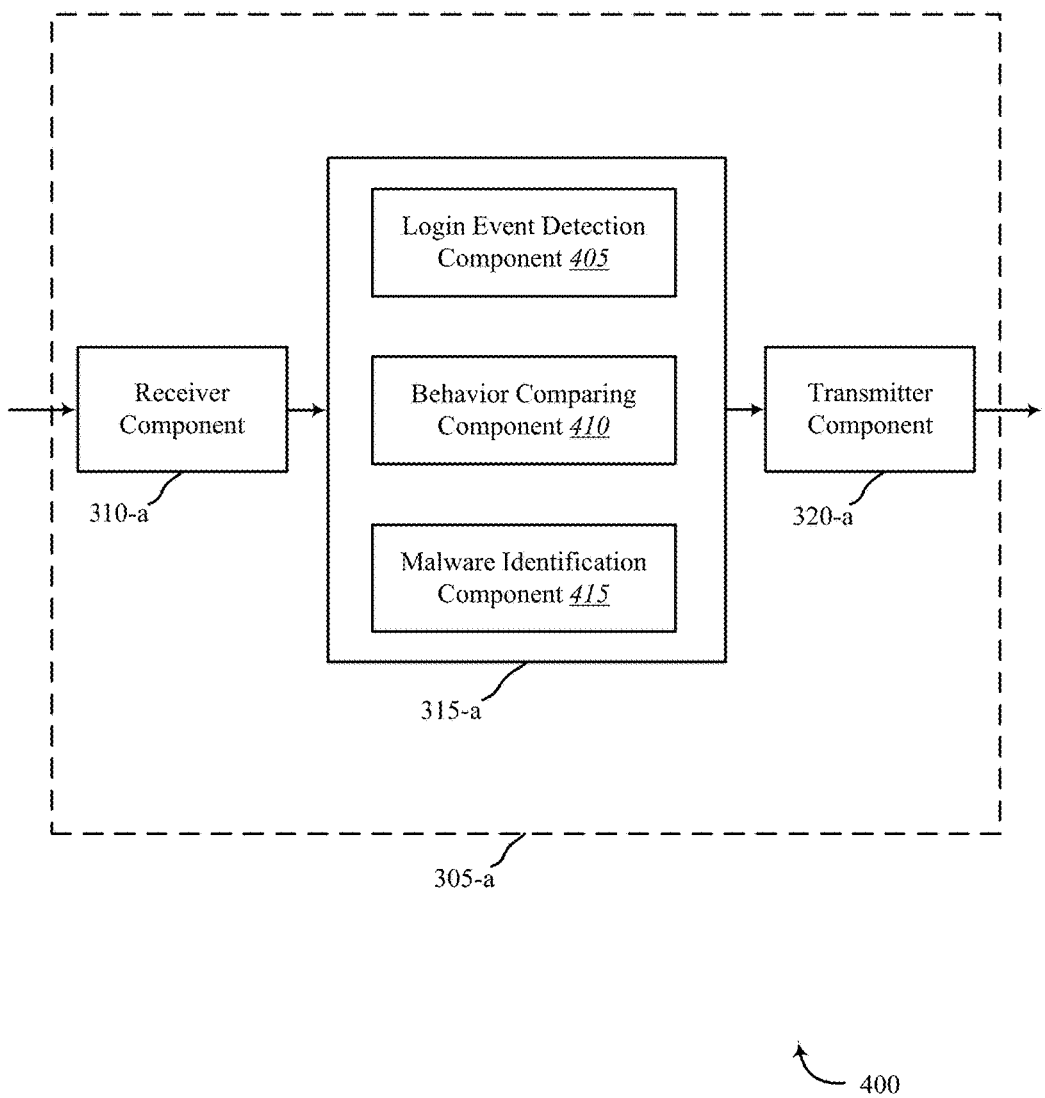
FIG. 4 is a block diagram illustrating embodiments in which the present systems and methods may be implemented, in accordance with various aspects of this disclosure.

FIG. 4 shows a block diagram 400 of a device 305-a for use in wireless communication, in accordance with various examples. The device 305-a may be an example of one or more aspects of a device 105, 105-a, and/or 305 described with reference to FIGS. 1-3, among others. The device 305-a may include a receiver component 310-a, a dynamic comparing component 315-a, and/or a transmitter component 320-a, which may be examples of the corresponding components of device 305. The device 305-a may also include a processor. Each of these components may be in communication with each other and/or other elements. The dynamic comparing component 315-a may include login event detection component 405, a behavior comparing component 410, or a malware identification component 415, or some combination, and/or other components relating to the present systems, methods, and techniques. The receiver component 310-a and the transmitter component 320-a may perform the functions of the receiver component 310 and the transmitter component 320, of FIG. 3, respectively.

The components of the device 305-a may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each component may also be implemented—in whole or in part—with instructions embodied in memory formatted to be executed by one or more general and/or application-specific processors.

In some embodiments, dynamic comparing component 315-a may include a login event detection component 405. This login event detection component 405 may be part of dynamic comparing component 315-a, may be separate from dynamic comparing component 315-a, and/or may work in conjunction with other elements and/or components of device 305-a, among others. Login event detection component 405 may perform one or more operations relating to decrypting server traffic associated with a login event, including identifying that a login event at one or more application has been attempted. For example, login event detection component 405 may identify one or more behaviors associated with a login event, including any one or more of server traffic, application text, application icons, server URLs, and/or required libraries associated with the application for which the login event has been attempted.

Login event detection component 405 may draw from a database of expected behaviors associated with the application for which the login event has been attempted in order to identify the event as a login event in some embodiments. In other embodiments, login event detection component 405 may run a legitimate use of one or more libraries associated with the application in order to discover expected behaviors associated with a login event for that application, and may compare these expected behaviors with the observed behaviors associated with the login event to be detected. Where one or more of the observed behaviors are similar or identical to the expected behaviors associated with the application, login event detection component 405 may identify that a login event is or has taken place.

In some embodiments, dynamic analysis component 315-a may include a behavior comparing component 410. This behavior comparing component 410 may be part of dynamic analysis component 315-a, may be separate from dynamic analysis component 315-a, and/or may work in conjunction with other elements and/or components of device 305-a, among others. Behavior comparing component 410 may perform one or more operations relating to detecting one or more behaviors associated with the login event, after the login event has been identified as such, among other things. For example, in accordance with various aspects of the present techniques, upon detecting using login event detection component 405 that a login event is or has occurred with respect to an application, behavior comparing component 410 may dynamically compare the user login event with one or more expected behaviors associated with the application for which the login event is occurring. These one or more expected behaviors may include any one or more of server traffic, application text, application icons, server URLs, or required libraries associated with the application. The one or more expected behaviors may be drawn from a behavior database in some examples, or in other examples, behavior comparing component 410 may run a legitimate use of one or more libraries associated with the application in order to discover expected behaviors associated with the login event for that application, and may compare these expected behaviors with the observed behaviors associated with the detected login event.

In some embodiments, dynamic analysis component 315-a may include a malware identification component 415. This malware identification component 415 may be part of dynamic analysis component 315-a, may be separate from dynamic analysis component 315-a, and/or may work in conjunction with other elements and/or components of device 305-a, among others. Malware identification component 415 may perform one or more operations relating to detecting malware, among other things. For example, malware identification component 415 may receive the results of the comparison performed by behavior comparing component 410, in which the observed one or more behaviors associated with the login event are compared with one or more expected behaviors associated with the application for which the login event occurred. Where some or all of the one or more observed expected behaviors of the login event are similar or identical to the one or more expected behaviors for the application, malware identification component 415 may determine that the application is likely not malware. Where some or all of the one or more observed expected behaviors of the login event are different from the one or more expected behaviors for the application, malware identification component 415 may determine that the application is potential malware.

Figure 5:
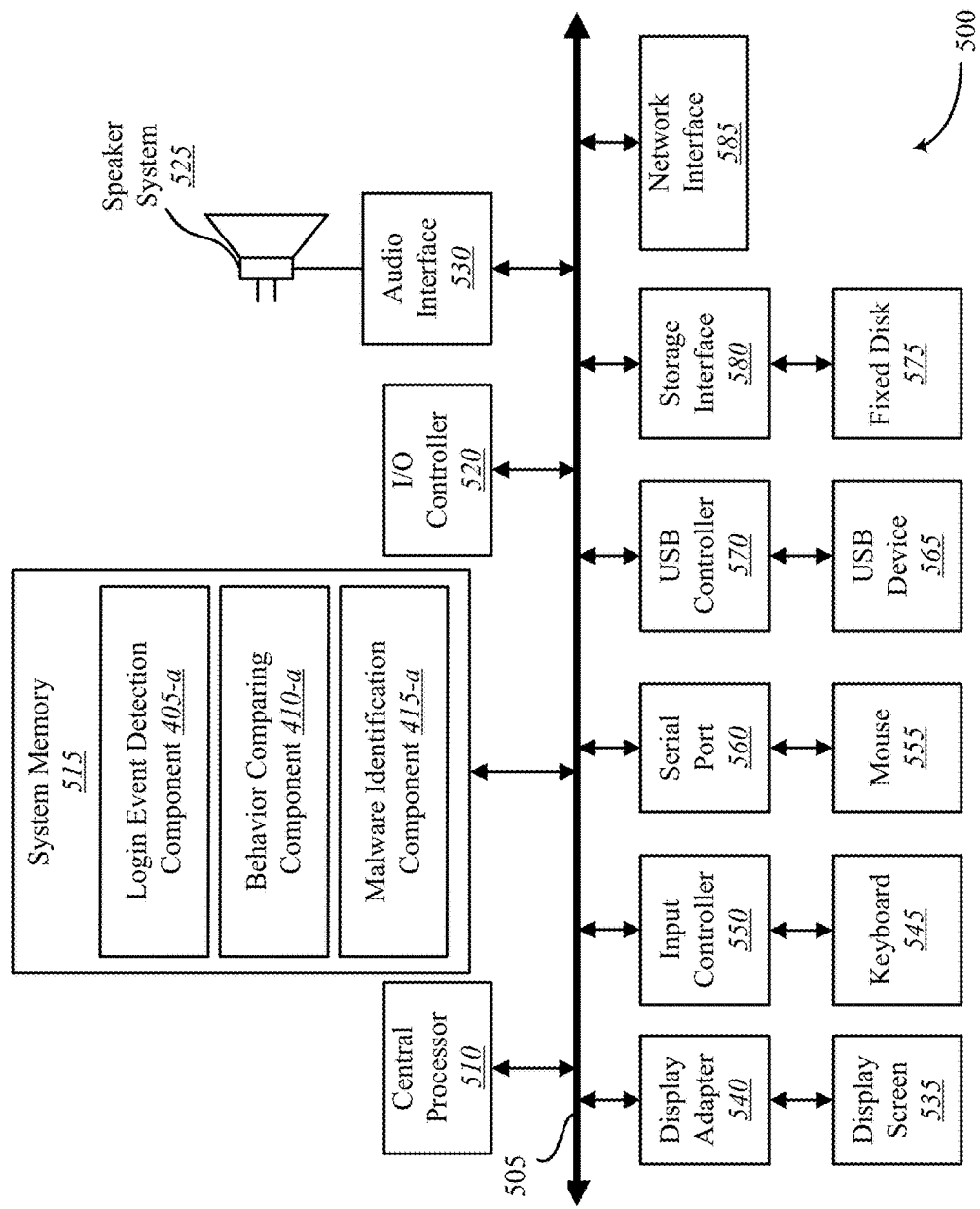
FIG. 5 is a block diagram illustrating embodiments of a system suitable for implementing embodiments of the present systems and methods, in accordance with various aspects of this disclosure.

FIG. 5 depicts a block diagram of a device controller 500 suitable for implementing the present systems and methods. The device controller 500 may be an example of a device, a server, a computing unit, and/or other units. In some embodiments, device controller 500 includes a bus 505 which interconnects components and/or elements of device controller 500 including one or more of: a central processor 510, a system memory 515 (which may include random access memory (RAM), read-only memory (ROM), flash RAM, and/or similar memory), an input/output controller 520, an external audio device, such as a speaker system 525 via an audio output interface 530, an external device, such as a display screen 535 via display adapter 540, an input device 545 (e.g., remote control device interfaced with an input controller 550), a USB device 565 (in some cases interfaced with a USB controller 570), and a storage interface 580. Also included are at least one sensor 555 connected to bus 505 through a sensor controller 560 and a network interface 585 (in some cases coupled directly to bus 505).

Bus 505 allows data communication between central processor 510, system memory 515 (which may include ROM, flash memory, RAM, and/or similar memory, as previously noted), and/or other elements. One type of memory, such as RAM, may be the main memory into which the operating system and application programs are loaded. The ROM and/or the flash memory can contain, among other code, the Basic Input-Output system (BIOS) that controls basic hardware operation such as the interaction with peripheral components or devices. For example, the different components (e.g., communication, identification, modification, generation, determination, analysis, feedback, and/or others) to implement the present systems and methods may be stored within the system memory 515. Applications resident with device controller 500 are generally stored on and accessed via a non-transitory computer readable medium, such as a hard disk drive (e.g., fixed disk 575) and/or other storage medium. Additionally, applications can be in the form of electronic signals modulated in accordance with the application and data communication technology when accessed via network interface 585.

Storage interface 580, as with the other storage interfaces of device controller 500, can connect to a standard computer readable medium for storage and/or retrieval of information—such as a fixed disk 575. Fixed disk 575 may be a part of device controller 500 or may be separate and accessed through other interface systems. Network interface 585 may provide a direct connection to a remote server via a direct network link to the Internet via a POP (point of presence). Network interface 585 may provide such connection using wireless techniques, including digital cellular telephone connection, Cellular Digital Packet Data (CDPD) connection, digital satellite data connection, or the like. In some embodiments, one or more sensors (e.g., device sensors, network sensors, system sensors, authentication sensors, communication sensors, and/or power sensors, etc.) connect to device controller 500 wirelessly via network interface 585.

Many other devices or subsystems may be connected in a similar manner (e.g., computing device, remote devices, transmitters, etc.). In addition, all of the devices shown in FIG. 5 need not be present to practice the disclosed systems and methods. The devices and subsystems can be interconnected in different ways from that shown in FIG. 5. Some aspects of some operations of a system, such as that shown in FIG. 5, may be readily known in the art and are not discussed in detail in this application.

Code to implement the present disclosure can be stored in a non-transitory computer-readable medium such as one or more of system memory 515 or fixed disk 575. The operating system(s) provided on device controller 500 may be iOS®, ANDROID®, MS-DOS®, MSWINDOWS®, OS/2®, UNIX®, LINUX®, and/or another operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiments may be characterized as communicated from one block to the next, other embodiments of the present systems and methods may include modified signals in place of such directly communicated signals as long as the informational and/or functional aspect of the signal is communicated between blocks. To some extent, a signal input at a second block can be conceptualized as a second signal derived from a first signal output from a first block due to physical limitations of the circuitry involved (e.g., there will inevitably be some attenuation and delay). Therefore, as used here, a second signal derived from a first signal includes the first signal and/or any modifications to the first signal—whether due to circuit limitations or due to passage through other circuit elements which do not change the informational and/or final functional aspect of the first signal.

Figure 6:
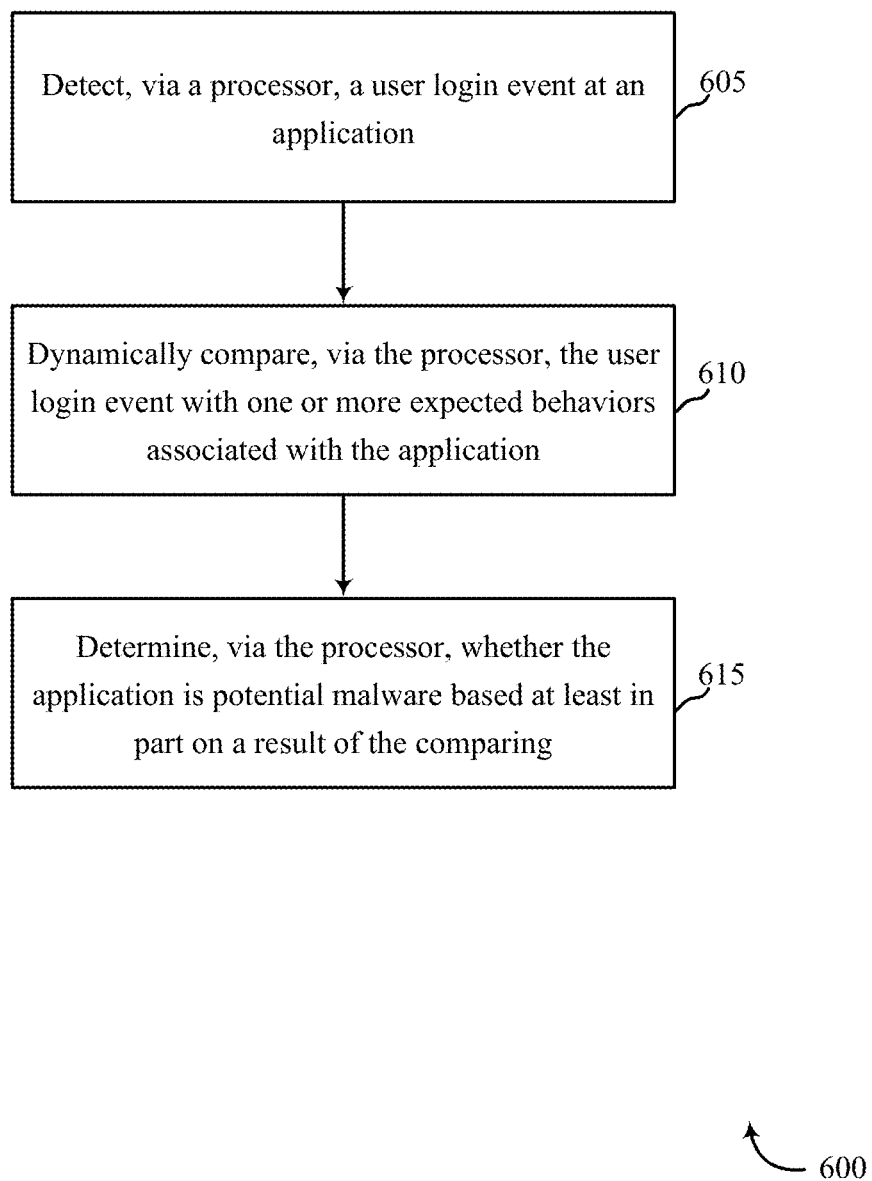
FIG. 6 is a flow chart illustrating embodiments of methods and techniques relating to detecting potential malware, in accordance with various aspects of this disclosure.

FIG. 6 is a flow chart illustrating an example of a method 600 for detecting malware, in accordance with various aspects of the present disclosure. For clarity, the method 600 is described below with reference to aspects of one or more of the device 105, 105-a and/or device 305, 305-a described with reference to FIGS. 1-4 (among others), and/or aspects of one or more of the dynamic comparing components 315, 315-a (among others) described with reference to FIGS. 3 and 4. In some embodiments, a device may execute one or more sets of codes to control the functional elements of the device to perform the functions described below. Additionally or alternatively, a server, a device, and/or a computing unit may perform one or more of the functions described below using special-purpose hardware.

At block 605, the method 600 may include detecting, via a processor, a user login event at an application. At block 610, the method 600 may include dynamically comparing, via the processor, the user login event with one or more expected behaviors associated with the application. At block 615, the method 600 may include determining, via the processor, whether the application is potential malware based at least in part on a result of the comparing.

For example, a user may attempt to access an application on his smartphone or personal computing device by inputting personal credentials, such as username and password, at a login page the user believes to be associated with that application. The processor may detect the user's attempt at a login event using any one or more of a plurality of identification means, including identifying a server traffic pattern associated with the login event; identifying images or text appearing on the login page of the application that may indicate a login event; monitoring server URLs, such as domain name, strings in the URLs, etc.; and/or monitoring required libraries associated with the application. Any one or more of these identified behaviors may be indicative of a login event.

Upon detecting that a user has initiated a login event, the processor may then monitor the subsequent behavior of the application in response to the login event. Again, the processor may monitor one or more behaviors associated with the application, and may compare these one or more behaviors with one or more expected behaviors associated with the application. For example, the processor may maintain a database or checklist identifying a plurality of expected behaviors associated with popular applications. In the event that a user attempts to initiate a login event with a less common application or a new application for which a list of expected behaviors has not been developed, the processor may simultaneously run a login event at the application of interest in order to discover the expected behaviors associated with that application. The processor may then compare the observed behaviors associated with the user login event with the expected behaviors associated with the application.

Where the processor detects that one or more of the observed behaviors associated with the user login event differ from the one or more expected behaviors associated with the application, the processor may determine that the application is potential malware. By contrast, where the processor detects that one or more of the observed behaviors associated with the user login event are similar or identical to the one or more expected behaviors associated with the application, the processor may determine that the application is "clean," or is likely not malware.

In some examples, this method for detecting malware may be run by the processor on the user environment. Where the processor determines that the application is potential malware, the processor may provide a report to the user, on the user environment, indicating that the application the user attempted to access is potential malware. In some embodiments, the user report may also provide details as to the type of behavior the malware conducted, and whether the malware successfully collected and/or distributed the user's personal credentials. In other examples, this method for detecting malware may be run on a dynamic analysis environment remote or distinct from the user environment. In this case, the determination that the application that the user attempted to access is potential malware may not be reported to the user.

In some embodiments, the operations at each of blocks 605-615 may be performed using the dynamic comparing component 315 and/or 315-a described with reference to FIGS. 3 and 4, among others.

Thus, the method 600 may provide for detecting malware based on detected user login events, based on one or more expected behaviors associated with the application for which the login event is made. It should be noted that the method 600 is just one implementation and that the operations of the method 600 may be rearranged, omitted, and/or otherwise modified such that other implementations are possible.

Figure 7:
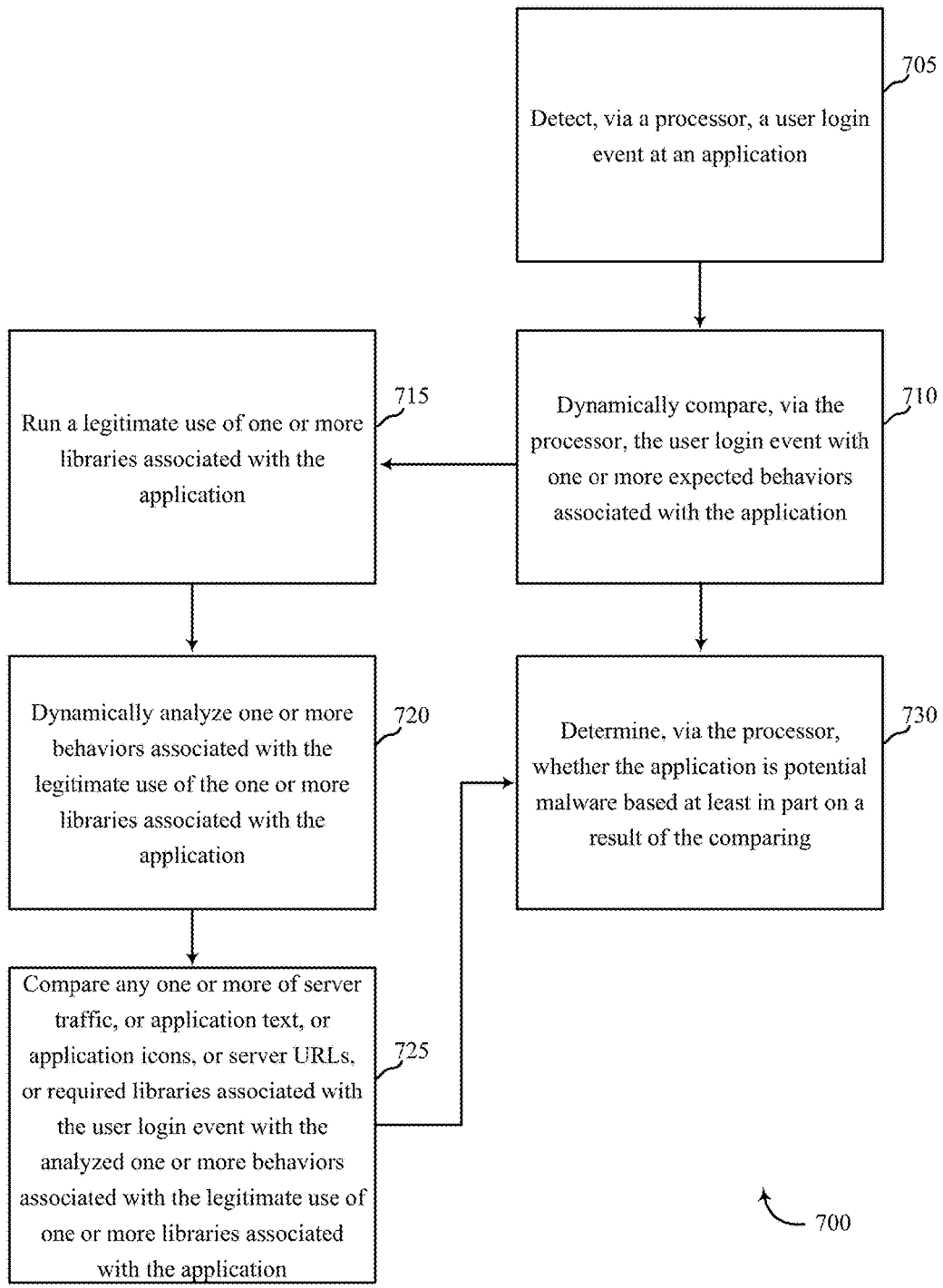
FIG. 7 is a flow chart illustrating embodiments of methods and techniques relating to detecting potential malware, in accordance with various aspects of this disclosure.

FIG. 7 is a flow chart illustrating an example of a method 700 for detecting malware, in accordance with various aspects of the present disclosure. For clarity, the method 700 is described below with reference to aspects of one or more of the device 105, 105-a and/or device 305, 305-a described with reference to FIGS. 1-4 (among others), and/or aspects of one or more of the dynamic comparing components 315, 315-a (among others) described with reference to FIGS. 3 and 4. In some embodiments, a device may execute one or more sets of codes to control the functional elements of the device to perform the functions described below. Additionally or alternatively, a server, a device, and/or a computing unit may perform one or more of the functions described below using special-purpose hardware.

At block 705, the method 700 may include detecting, via a processor, a user login event at an application. At block 710, the method 700 may include dynamically comparing, via the processor, the user login event with one or more expected behaviors associated with the application. At block 715, the method 700 may include running a legitimate use of one or more libraries associated with the application. At block 720, the method 700 may include dynamically analyzing one or more behaviors associated with the legitimate use of the one or more libraries associated with application. At block 725, the method 700 may include comparing any one or more of server traffic, or application text, or application icons, or server URLs, or required libraries associated with the user login event with the analyzed one or more behaviors associated with the legitimate use of one or more libraries associated with the application. At block 730, the method 700 may include determining, via the processor, whether the application is potential malware based at least in part on a result of the comparing.

In some embodiments, the operations at each of blocks 705-730 may be performed using the dynamic comparing component 315 and/or 315-a described with reference to FIGS. 3 and 4, among others.

Thus, the method 700 may provide for detecting malware by running a legitimate use of one or more libraries associated with the application in order to derive one or more expected behaviors with which to compare the observed behaviors of the login event. It should be noted that the method 700 is just one implementation and that the operations of the method 700 may be rearranged, omitted, and/or otherwise modified such that other implementations are possible.

Figure 8:
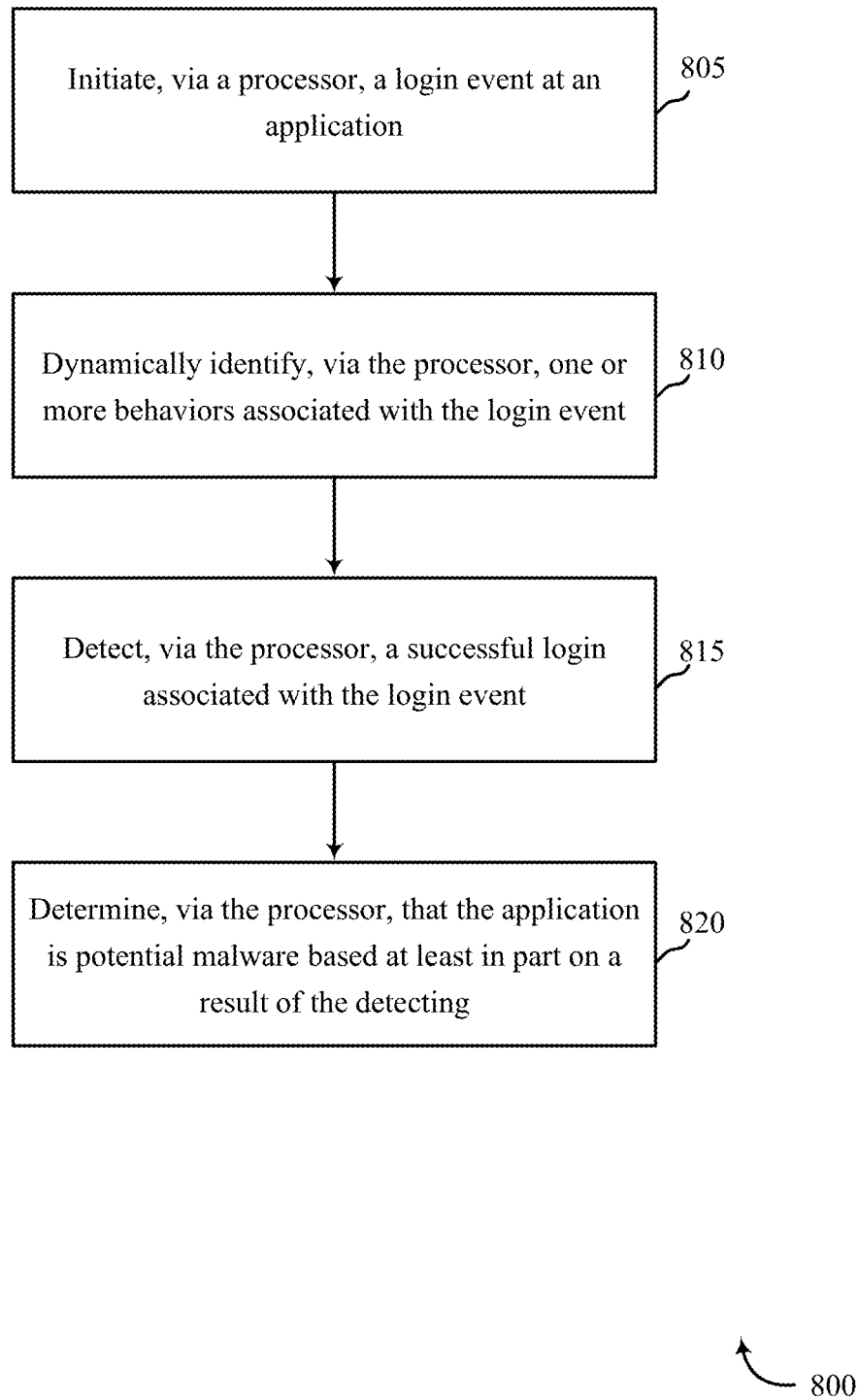
FIG. 8 is a flow chart illustrating embodiments of methods and techniques relating to detecting potential malware, in accordance with various aspects of this disclosure.

FIG. 8 is a flow chart illustrating an example of a method 800 for detecting malware, in accordance with various aspects of the present disclosure. For clarity, the method 800 is described below with reference to aspects of one or more of the device 105, 105-a and/or device 305, 305-a described with reference to FIGS. 1-4 (among others), and/or aspects of one or more of the dynamic comparing components 315, 315-a (among others) described with reference to FIGS. 3 and 4. In some embodiments, a device may execute one or more sets of codes to control the functional elements of the device to perform the functions described below. Additionally or alternatively, a server, a device, and/or a computing unit may perform one or more of the functions described below using special-purpose hardware.

At block 805, the method 800 may include initiating, via a processor, a login event at an application. At block 810, the method 800 may include dynamically identifying, via the processor, one or more behaviors associated with the login event. At block 815, the method 800 may include detecting, via the processor, a successful login associated with the login event. At block 820, the method 800 may include determining, via the processor, that the application is potential malware based at least in part on a result of the detecting.

The method 800 may accordingly be used to develop a database of predicted behaviors associated with login events for applications in some examples, or in other examples may be used simultaneously with a user initiated login event to detect behaviors associated with a legitimate use of one or more libraries associated with the application.

In some embodiments, the operations at each of blocks 805-820 may be performed using the dynamic comparing component 315 and/or 315-a described with reference to FIGS. 3 and 4, among others.

Thus, the method 800 may provide for detecting malware by initiating a login event in order to derive one or more expected behaviors with which to compare the observed behaviors of a user login event. It should be noted that the method 800 is just one implementation and that the operations of the method 800 may be rearranged, omitted, and/or otherwise modified such that other implementations are possible.

In some examples, aspects from two or more of the methods 600, 700, and 800 (among others) may be combined and/or separated. It should be noted that the methods 600, 700, 800, etc. are just example implementations, and that the operations of the methods 600, 700, 800, etc. may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium.

For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A method for detecting malware, comprising:
    detecting, via a processor, a user login event at an application;
    monitoring, via the processor, response activity of the application based at least in part on the user login event, the monitoring comprising at least an evaluation of traffic associated with the application;
    determining whether the application is a known application or an unknown application, wherein the known application includes a list of expected behaviors stored in a database repository, and the unknown application has no expected behaviors stored in the database repository;
    upon determining the application is the known application:
        retrieving, via a communication link, one or more expected behaviors of the application from the database repository; and
    upon determining the application is the unknown application:
        running a legitimate use of one or more libraries associated with the application; and
        identifying, via the processor, one or more observed behaviors of the application based at least in part on the running;
    dynamically comparing, via the processor, the user login event with the one or more expected behaviors associated with the application when the application is determined to be the known application, or dynamically comparing the user login event with the one or more observed behaviors when the application is determined to be the unknown application; and
    determining, via the processor, whether the application is potential malware based at least in part on a result of the comparing.

2. The method of claim 1, wherein the dynamically comparing comprises:
    comparing any one or more of server traffic, or application text, or application icons, or server Uniform Resource Locators (URLs), or required libraries associated with the user login event with a database of known one or more expected behaviors associated with the application.

3. The method of claim 2, wherein the dynamically comparing further comprises:
    decrypting the server traffic.

4. The method of claim 1, wherein detecting the user login event comprises:
    detecting one or more expected behaviors associated with a login event.

5. The method of claim 4, wherein the one or more expected behaviors associated with the login event comprise any one or more of server traffic, or application text, or application icons, or server URLs, or required libraries.

6. The method of claim 1, wherein the dynamically comparing comprises:
    dynamically analyzing one or more behaviors associated with the legitimate use of the one or more libraries associated with the application; and
    comparing any one or more of server traffic, or application text, or application icons, or server URLs, or required libraries associated with the user login event with the analyzed one or more behaviors associated with the legitimate use of the one or more libraries associated with the application.

7. The method of claim 1, further comprising:
    upon determining the application is potential malware, reporting the potential malware to the user.

8. The method of claim 7, wherein reporting the potential malware to the user comprises:
    detecting that the user login event has resulted in communication of one or more user login details to the malware application; and
    reporting that communication to the user.

9. An apparatus for detecting malware comprising:
    a processor;
    a memory in electronic communication with the processor, wherein the memory stores computer readable executable instructions that when executed by the processor cause the processor to:
        detect, via a processor, a user login event at an application;
        monitor, via the processor, response activity of the application based at least in part on the user login event, the monitoring comprising at least an evaluation of traffic associated with the application;
        determine whether the application is a known application or an unknown application, wherein the known application includes a list of expected behaviors stored in a database repository, and the unknown application has no expected behaviors stored in the database repository;
        upon determining the application is the known application:
            retrieve, via a communication link, one or more expected behaviors of the application from the database repository; and
        upon determining the application is the unknown application:
            run a legitimate use of one or more libraries associated with the application; and
            identify, via the processor, one or more observed behaviors of the application based at least in part on the running;
        dynamically compare, via the processor, the user login event with the one or more expected behaviors associated with the application when the application is determined to be the known application, or dynamically comparing the user login event with the one or more observed behaviors when the application is determined to be the unknown application; and
        determine, via the processor, whether the application is potential malware based at least in part on a result of the comparing.

10. The apparatus of claim 9, wherein the instructions to dynamically compare are further executable by the processor to:
    compare any one or more of server traffic, or application text, or application icons, or server Uniform Resource Locators (URLs), or required libraries associated with the user login event with a database of known one or more expected behaviors associated with the application.

11. The apparatus of claim 10, wherein the instructions to dynamically compare are further executable by the processor to:
    decrypt the server traffic.

12. The apparatus of claim 9, wherein the instructions to detect the user login event are further executable by the processor to:

detect one or more expected behaviors associated with a login event.

13. The apparatus of claim 9, wherein the instructions to dynamically compare are further executable by the processor to:

dynamically analyze one or more behaviors associated with the legitimate use of the one or more libraries associated with the application; and compare any one or more of server traffic, or application text, or application icons, or server URLs, or required libraries associated with the user login event with the analyzed one or more behaviors associated with the legitimate use of the one or more libraries associated with the application.

14. The apparatus of claim 9, wherein upon determining the application is potential malware, the instructions are further executable by processor to:

report the potential malware to the user.

15. The apparatus of claim 14, wherein the instructions to report the potential malware to the user are further executable by the processor to:

detect that the user login event has resulted in communication of one or more user login details to the malware application; and report that communication to the user.

16. The apparatus of claim 9, further comprising a non-transitory computer-readable storage medium storing instructions executable by the processor to:

detect, via a processor, a user login event at an application;

monitor, via the processor, response activity of the application based at least in part on the user login event, the monitoring comprising at least an evaluation of traffic associated with the application;

determine whether the application is a known application or an unknown application, wherein the known application includes a list of expected behaviors stored in a database repository, and the unknown application has no expected behaviors stored in the database repository;

upon determining the application is the known application:

retrieve, via a communication link, one or more expected behaviors of the application from the database repository; and upon determining the application is the unknown application:

run a legitimate use of one or more libraries associated with the application; and identify, via the processor, one or more observed behaviors of the application based at least in part on the running;

dynamically compare, via the processor, the user login event with the one or more expected behaviors associated with the application when the application is determined to be the known application, or dynamically comparing the user login event with the one or more observed behaviors when the application is determined to be the unknown application; and determine, via the processor, whether the application is potential malware based at least in part on a result of the comparing.

\* \* \* \* \*